(12) United States Patent
Haga et al.

(10) Patent No.: US 6,942,154 B1
(45) Date of Patent: Sep. 13, 2005

(54) CARD CONNECTOR AND PORTABLE TELEPHONE HAVING THE SAME

(75) Inventors: Hideo Haga, Yokohama (JP); Koji Kuchiishi, Kawasaki (JP); Yoji Inomata, Yokohama (JP); Toshihiro Higuchi, Kawasaki (JP); Yasunobu Ikeda, Yokohama (JP)

(73) Assignee: Matsushita Electric Industrial Co, Ltd., Osaka (JP)

( * ) Notice: Subject to any disclaimer, the term of this patent is extended or adjusted under 35 U.S.C. 154(b) by 579 days.

(21) Appl. No.: 09/980,740

(22) PCT Filed: Feb. 23, 2000

(86) PCT No.: PCT/JP01/01368

§ 371 (c)(1),
(2), (4) Date: Mar. 18, 2002

(87) PCT Pub. No.: WO01/63885

PCT Pub. Date: Aug. 30, 2001

(30) Foreign Application Priority Data

Feb. 24, 2000 (JP) ................................ 2000-48159

(51) Int. Cl.[7] ............................................. G06K 7/00
(52) U.S. Cl. ...................................... 235/486; 235/441
(58) Field of Search ................................ 235/475, 476, 235/477, 478, 491, 492, 493, 486, 487, 441, 235/473

(56) References Cited

U.S. PATENT DOCUMENTS

| | | | | |
|---|---|---|---|---|
| 5,823,828 A | * | 10/1998 | Bricaud et al. | 439/630 |
| 6,074,226 A | * | 6/2000 | Futatsugi et al. | 439/157 |
| 6,106,317 A | * | 8/2000 | Michaelis et al. | 439/326 |
| 6,165,021 A | * | 12/2000 | Bourne | 439/630 |
| 6,175,505 B1 | | 1/2001 | Cheng et al. | 361/752 |
| 6,557,761 B1 | * | 5/2003 | Oya et al. | 235/441 |
| 6,783,926 B2 | * | 8/2004 | Reece | 430/630 |

FOREIGN PATENT DOCUMENTS

| | | |
|---|---|---|
| JP | 5-6466 | 1/1993 |
| JP | 2574710 | 10/1996 |
| JP | 11-195466 | 7/1999 |
| WO | 98/13784 | 4/1998 |

* cited by examiner

Primary Examiner—Thien M. Le
(74) Attorney, Agent, or Firm—Pearne & Gordon LLP

(57) ABSTRACT

A card connector includes a base member and two sets of contact members which are provided on the base member. One ends of the contact members serve as joining portions with respect to a circuit board of a portable telephone. The other ends of the contact members serve as contact portions with respect to a card. The joining portions are respectively disposed at mutually opposite ends of the base member. The contact portions are bent in a chevron shape and have terminations in a card fitting direction.

5 Claims, 3 Drawing Sheets

CARD CONNECTOR AND PORTABLE TELEPHONE HAVING THE SAME

This application claims the benefit of International Application Number PCT/JP01/01368, which was published in English on Aug. 30, 2001.

TECHNICAL FIELD

The present invention relates to a card connector and a portable telephone having the same, and more particularly to a card connector suitable for connection of a subscriber identification module (SIM) card and a portable telephone having the same.

BACKGROUND ART

Conventionally, as a card connector of this type, a contacting device for an identification card disclosed in, for example, Japanese Patent No. 2,574,710 has been known. Disclosed in FIG. 5 of this patent publication is a contacting device for an identification card having contact regions arranged in two rows (A, B), wherein two sets of contact members 81 and 82 having the same length are arranged in an interdigitated manner, and terminations of the contact members 81 and 82 are disposed on the opposite side. Further, in FIG. 6 of the aforementioned patent publication, there is disclosed a contacting device for an identification card having contact regions arranged in two rows (A, B), wherein two sets of contact members 10 and 11 having mutually different lengths are arranged alternately, and terminations of the contact members 10 and 11 are arranged on the same side.

However, with the contacting device for an identification card disclosed in the aforementioned FIG. 5, if sliding insertion is assumed, since the terminations of the portions of the contact portions 81 and 82 which come into contact with contacts 1 of the card are mutually reversely oriented with respect to the card fitting direction in the same way as FIG. 1 of the aforementioned publication, there has been a risk that the front end of the inserted card collides against the contact members when the card is slidingly fitted.

In addition, with the contacting device for an identification card disclosed in FIG. 6, even if sliding insertion is assumed, since the terminations of the portions of the contact portions 10 and 11 which come into contact with the contacts 1 of the card are oriented in the same direction in the same way as FIG. 2 of the aforementioned publication, there is no risk that the front end of the card collides against the contact members when the card is fitted. However, since the terminations of the contact portions 10 and 11 are arranged on the same side, soldering with respect to a printed circuit board is performed only on one side, so that there has been a problem in that the printed circuit board cannot be stably fixed.

DISCLOSURE OF THE INVENTION

The invention has been devised to overcome the above-described problems, and its object is to provide a card connector capable of effecting stable fixation to the printed circuit board and of preventing the collision at the time of the fitting of the card, as well as a portable telephone having the same.

In accordance with the invention, there is provided a card connector including a base member and two sets of contact members which are provided on the base member and whose one ends serve as joining portions with respect to a circuit board and whose other ends serve as contact portions with respect to a card, characterized in that the joining portions of the two sets of contact members are respectively disposed at mutually opposite ends of the base member, and that the contact portions of the two sets of contact members have terminations in a card fitting direction. By virtue of this construction, the card connector can be fixed stably to the circuit board at the joining portions, and it is possible to prevent the collision of the front end of the card against the contact portions at the time of the fitting of the card.

BEST MODE FOR CARRYING OUT THE PRESENT INVENTION

Hereafter, a description will be given of an embodiment of the invention with reference to the drawings.

Figure 1A:
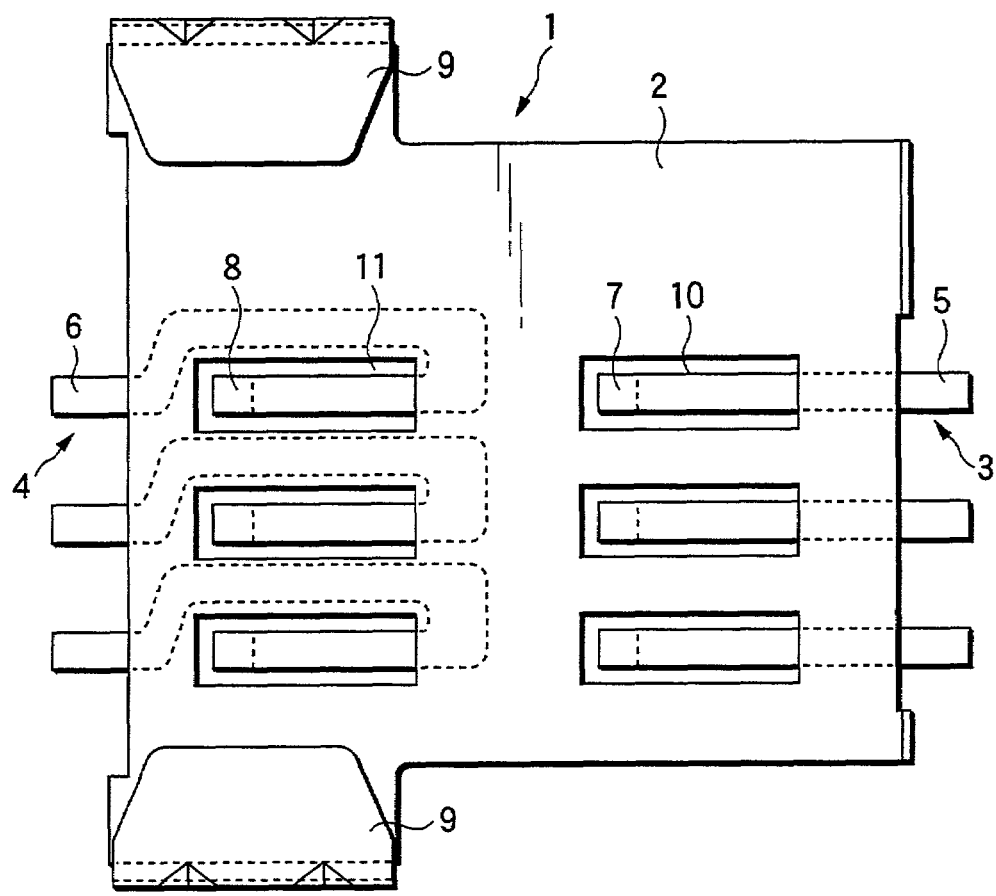
FIGS. 1(a) and 1(b) are diagrams illustrating a card connector in accordance with an embodiment of the invention.
Figure 1B:
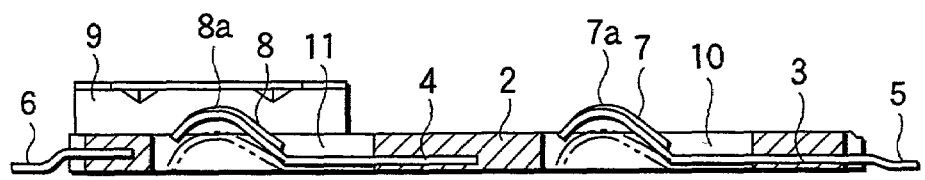

FIGS. 1(a) and 1(b) are diagrams illustrating a card connector in accordance with an embodiment of the invention. Here, FIG. 1(a) is a plan view, and FIG. 1(b) is a cross-sectional view.

As shown in FIGS. 1(a) and 1(b), a card connector 1 is composed of a plate-like base member 2, two sets of contact members 3 and 4 fixed to the base member 2, and a pair of holding portions 9. The base member 2 has a substantially rectangular planar shape, and its left end side is formed to be wide. In the drawings, a card is loaded by being slid on the card connector 1 from the right-hand side toward the left-hand side. It should be noted that, in the description that follows, the direction in which the card advances during the loading of the card is assumed to be the forward direction.

The set of three contact members 3 are formed by thin elongated metal pieces, and joining portions 5 which are soldered to a printed circuit board (not shown) are respectively provided at their ends where the card is fitted, while contact portions 7 which come into contact with the contacts of the card are respectively provided at the other ends. Each contact member 3 extends in such a manner as to creep into the interior of the base member 2 from an end face of the base member 2 on the card fitting side thereof and then advance straight. Then, the contact member 3 is exposed from a wall surface of a through hole 10 with a rectangular cross section formed in the base member 2 in correspondence with the contact portion 7. Further, the contact member 3 is bent upward from a substantially central portion in the through hole 10, becomes higher than the obverse surface (upper surface) of the base member 2 and forms a peak 7a, and the contact member 3 is subsequently bent downward to its termination. In other words, the contact portion 7 is bent in a chevron shape and has a termination in the card fitting direction.

Meanwhile, the contact members 4 are formed by thin elongated metal pieces, and joining portions 6 which are soldered to the printed circuit board are respectively provided at their ends away from the card fitting side, while contact portions 8 which come into contact with the contacts of the card are respectively provided at the other ends. Each contact member 4 extends in such a manner as to creep into the interior of the base member 2 from an end face opposite to its card fitting side, and the contact member 4 is bent leftward in terms of its advancing direction before a through hole 11 with a rectangular cross section formed in the base member 2 in correspondence with the contact portion 8. Then, the contact member 4 advances straight in parallel with the through hole 11, and its direction is reversed after the contact member 4 has gone beyond the through hole 11, and the contact member 4 is exposed from a wall surface of the through hole 11 on the card fitting side thereof. Further, the contact member 4 is bent upward from a substantially central portion of the interior of the through hole 11, becomes higher than the obverse surface (upper surface) of the base member 2 and forms a peak 8a, and the contact member 4 is subsequently bent downward to its termination. In other words, the contact portion 8 is bent in a chevron shape and has a termination in the card fitting direction. Thus, as the direction of the contact members 4 is reversed, the provision of the joining portions 6 on the side away from the joining portions 5 and the alignment of the direction of the contact portions 8 with the direction of the contact portions 7 are made compatible.

The pair of holding portions 9 are respectively attached to both side ends of a widened portion of the base member 2. The holding portions 9 are formed by bending a thin metal plate, and their one ends are respectively fixed to the side ends of the widened portion. By virtue of their resiliency, the holding portions 9 press from above and hold both sides of a front portion of the card fitted to the card connector 1.

Figure 2A:
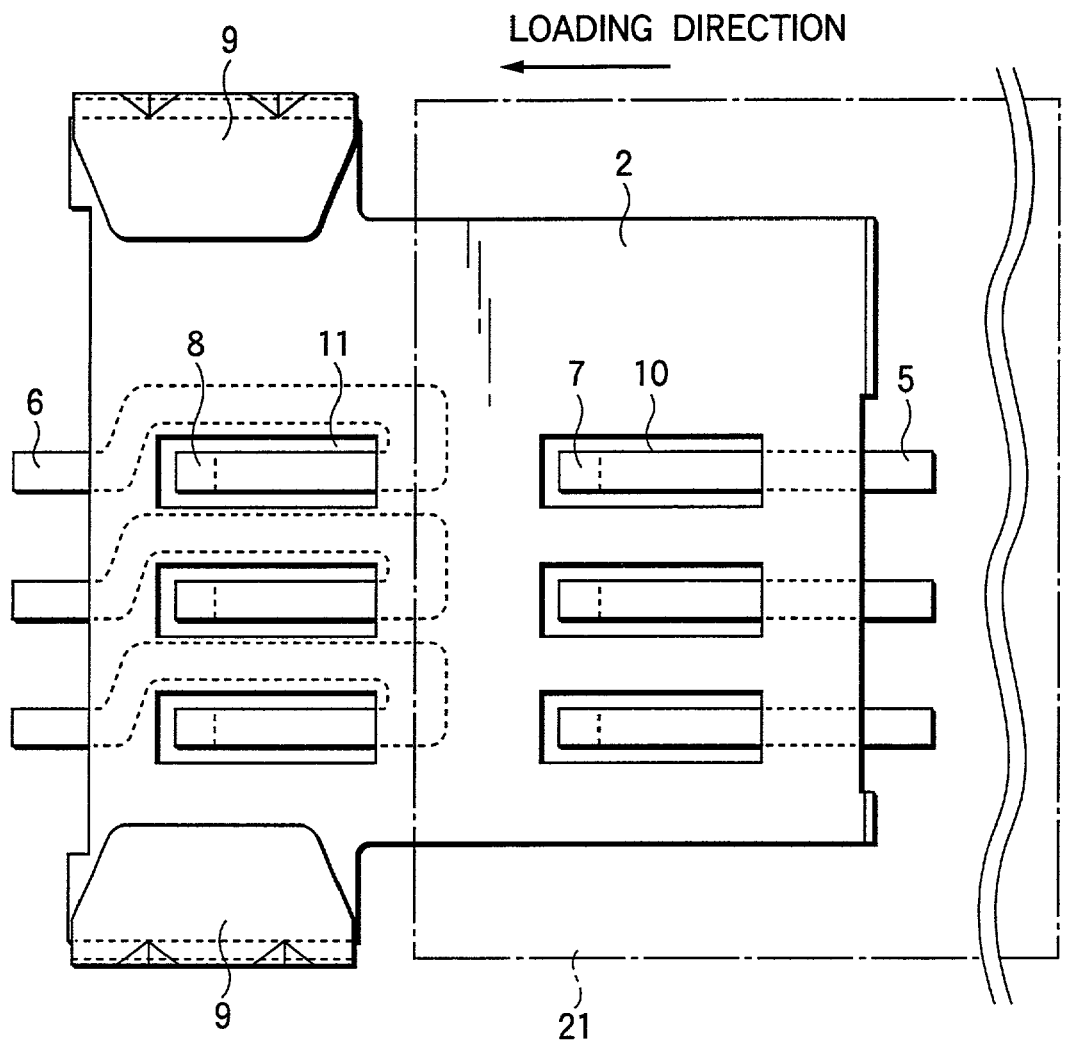
FIGS. 2(a) and 2(b) are diagrams for explaining the procedure for fitting the card to the card connector in accordance with the embodiment of the invention.
Figure 2B:
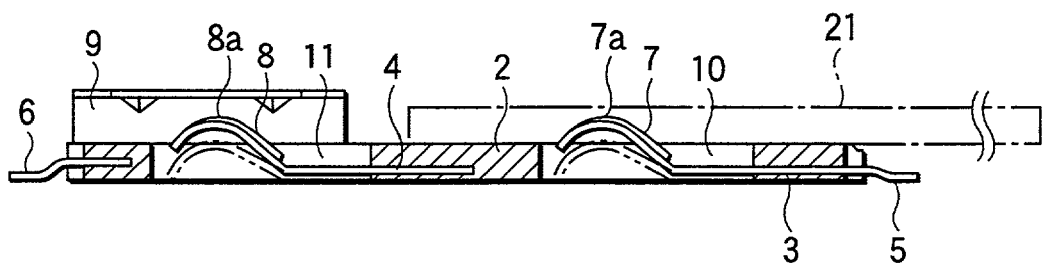

Next, with reference to FIGS. 2(a) and 2(b), a description will be given of the procedure of fitting the card. When the card 21 is fitted to the card connector, a front end (left end in the drawing) of the card 21 is adjusted to the right ends of the holding portions 9, and the card 21 is slid leftward while passing between the holding members 9 of the base member 2. At this time, the contact portions 7 and 8 of the contact members 3 and 4 are pressed by the lower surface of the card 21, are deflected downward in the through holes 10 and 11, and assume a state of being accommodated in the through holes 10 and 11, respectively, as indicated at the broken lines in the drawing. In addition, both contact portions 7 and 8 become gradually high from the card fitting side, and after forming the peak 8a, they are bent downward up to their terminations, so that a situation does not occur in which the front end of the card 21 collides against the contact portions 7 and 8 and damage the contact portions 7 and 8. It should be noted that a rear end portion of the card 21 is held by, for instance, an inner wall surface of the housing of the portable telephone, as will be described later.

Figure 3:
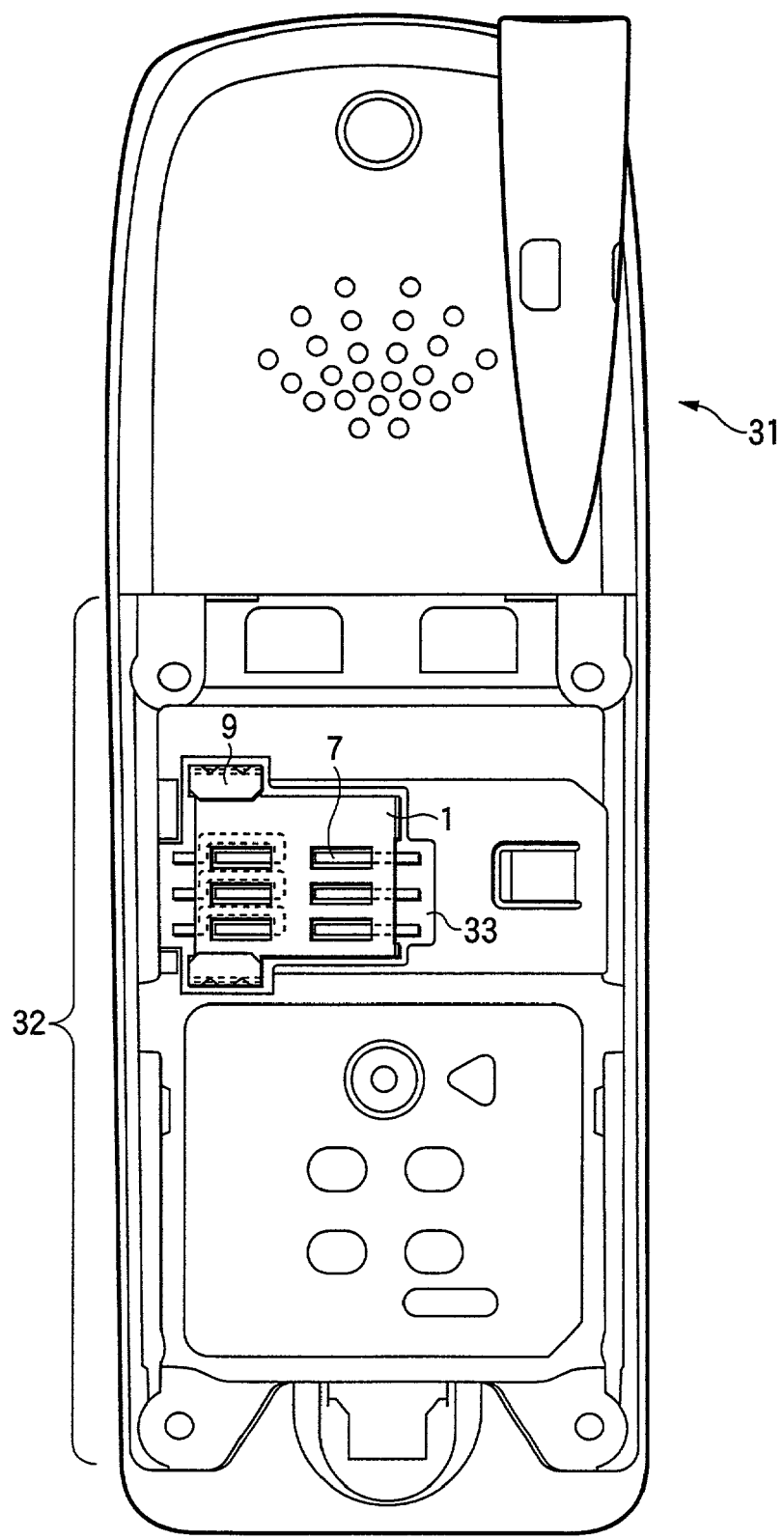
FIG. 3 is a diagram for explaining a portable telephone having the card connector in accordance with the embodiment of the invention.

FIG. 3 is a diagram for explaining the portable telephone having the card connector in accordance with the embodiment of the invention. This drawing shows a reverse surface-side housing 31. An opening 32 for attaching a cover-cum-battery is formed in this reverse surface-side housing 31 in such a manner as to extend from a substantially central portion to a lower edge thereof. A printed circuit board 33 of the main body of the portable telephone is exposed in the opening, and the card connector 1 is fixed on it by soldering. Preferably, a projection is formed in advance at a position which opposes the contact portions 7 when the cover-cum-battery is fitted in the opening 32, so as to hold the rear end portion of the card when the card is fitted.

Thus, with the card connector 1 in accordance with the embodiment of the invention, since the joining portions 5 and 6 at both ends of the base member 2 are joined to the printed circuit board, the base member 1 can be stably fixed to the printed circuit board. In addition, since the contact portions 7 and 8 are bent in the chevron shape, and have terminations in the card fitting direction, it is possible to prevent the front end of the card from colliding against the contact members at the time of the loading of the card.

INDUSTRIAL APPLICABILITY

As described above, in accordance with the invention, it is possible to provide a card connector having excellent advantages in that the card connector can be fixed stably to the circuit board, and that it is possible to prevent the collision of the front end of the card against the contact portions at the time of the fitting of the card.

While only a certain embodiment of the invention has been specifically described herein, it will be apparent that numerous modifications may be made thereto without departing from the spirit and scope of the invention.

What is claimed is:

1. A card connector comprising:
a base member; and
two contact members provided on said base member, each of said contact members including a joining portion with respect to a circuit board at a first end thereof and a contact portion with respect to a card at a second end thereof,
wherein the joining portions of said two contact members are respectively disposed at mutually opposite ends of said base member, and
wherein the contact portions of said two contact members have terminations in a card fitting direction.

2. The card connector according to claim 1,
wherein one of said contact members extends from the card-fitting-side end of said base member in a direction toward the card fitting direction, and
wherein the other of said contact members extends from the end opposite to the card-fitting-side end in a direction opposite to the card fitting direction, and has its direction reversed in the card fitting direction.

3. The card connector according to claim 1,
wherein said base member include a member for holding the card, and
wherein said member for holding the card is disposed at an edge portion of said base member opposite to a card fitting side thereof.

4. The card connector according to claim 1,
wherein said base member include a through hole corresponding to the contact portion, and
wherein each of said contact members passes from an end face of said base member through an interior of said base member, and is exposed to an outside of said base member from the through hole.

5. A portable telephone comprising said card connector according to claim 1.

* * * * *

UNITED STATES PATENT AND TRADEMARK OFFICE
CERTIFICATE OF CORRECTION

PATENT NO. : 6,942,154 B1
DATED : September 13, 2005
INVENTOR(S) : Haga et al.

It is certified that error appears in the above-identified patent and that said Letters Patent is hereby corrected as shown below:

Title page,
Item [22], PCT Filed, please delete "Feb. 23, 2000" and insert therefor
-- Feb. 23, 2001 --.

Signed and Sealed this

Eighth Day of November, 2005

JON W. DUDAS
*Director of the United States Patent and Trademark Office*